Nov. 6, 1923. 1,472,880
J. A. MAHR
DETACHABLE SLEIGH RUNNER FOR BABY CARRIAGES
Filed June 6, 1921
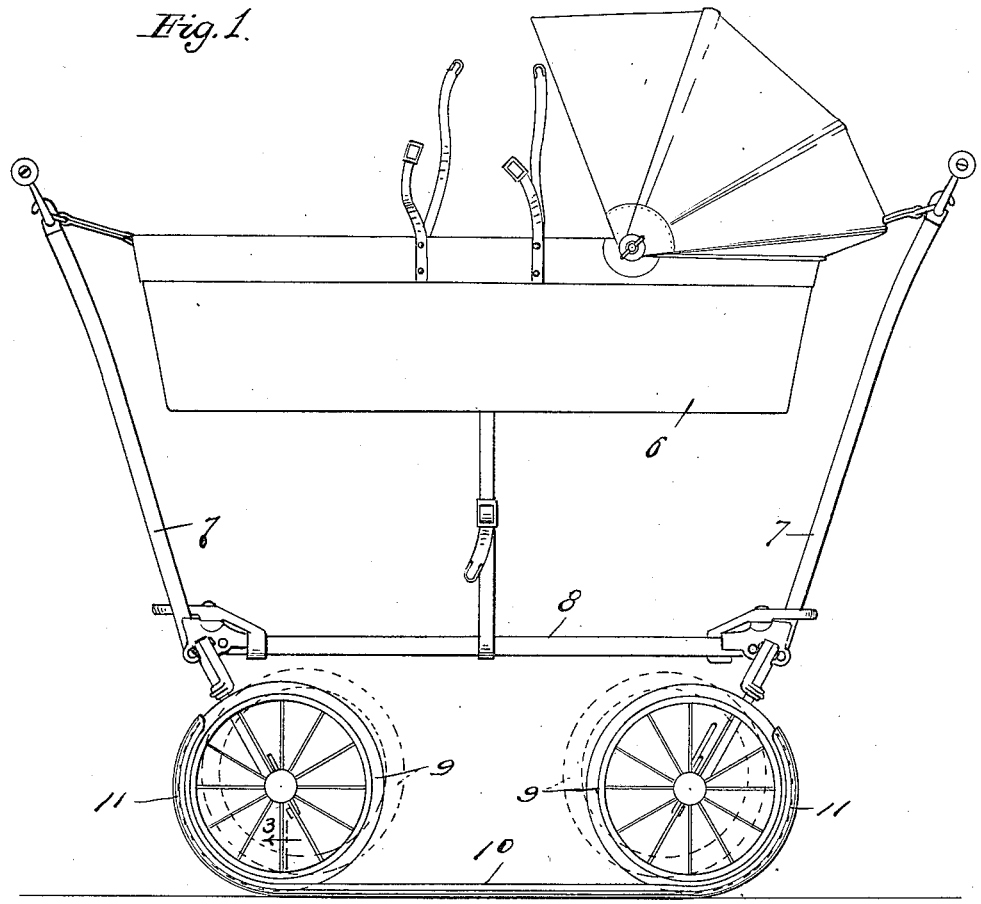
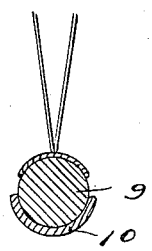
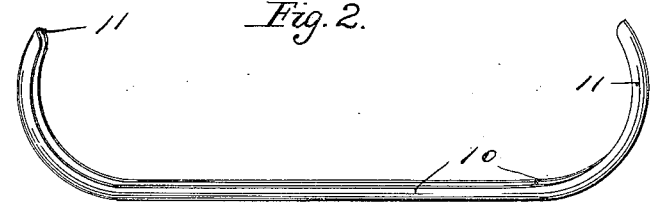
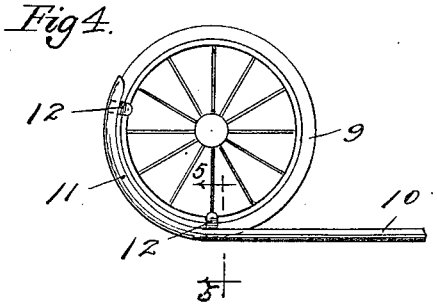
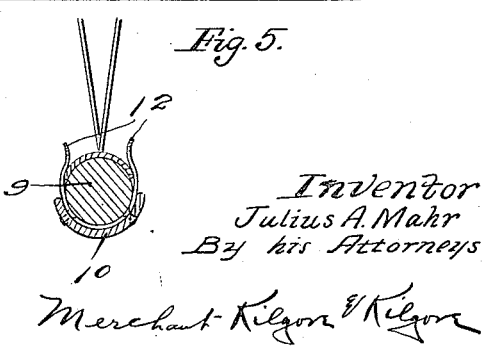
Inventor
Julius A. Mahr
By his Attorneys
Merchant-Kilgore & Kilgore Patented Nov. 6, 1923.

1,472,880

UNITED STATES PATENT OFFICE.

JULIUS A. MAHR, OF MINNEAPOLIS, MINNESOTA.

DETACHABLE SLEIGH RUNNER FOR BABY CARRIAGES.

Application filed June 6, 1921. Serial No. 475,217.

*To all whom it may concern:*

Be it known that I, JULIUS A. MAHR, a citizen of the United States, residing at Minneapolis, in the county of Hennepin and State of Minnesota, have invented certain new and useful Improvements in Detachable Sleigh Runners for Baby Carriages; and I do hereby declare the following to be a full, clear, and exact description of the invention, such as will enable others skilled in the art to which it appertains to make and use the same.

My present invention has for its object to provide an extremely simple and highly efficient set of detachable sleigh runners applicable to the wheels of a baby carriage to convert the same into a sleigh, and more particularly, they are adapted for use in connection with folding baby carriages of the type disclosed in my United States Letters Patent #1,335,122, issued June 30th, 1920, and an application executed of even date herewith.

To the above ends, the invention consists of the novel devices and combination of devices hereinafter described and defined in the claim.

In the accompanying drawings which illustrate the invention, like characters indicate like parts throughout the several views.

Referring to the drawings:—

Fig. 1 is a side elevation of a folding baby carriage with some parts shown in different positions by means of broken lines and having one of the improved sleigh runners applied to the wheels shown;

Fig. 2 is a perspective view of the sleigh runners removed from the baby carriage;

Fig. 3 is a detail view in section taken on the line 3—3 of Fig. 1 on an enlarged scale;

Fig. 4 is a fragmentary view showing a modified form of the sleigh runners applied to one of the wheels of the baby carriage; and Fig. 5 is a detail view in section taken on the line 5—5 of Fig. 4, on an enlarged scale.

Of the parts of the baby carriage illustrated, it is only necessary to note the body 6 suspended from posts 7 secured to a running gear, indicated as an entirety by the numeral 8, with the exception of front and rear pairs of wheels 9, foldably mounted for movement, toward and from each other, and held in operative positions, as fully set forth in my above identified patent and application.

Referring first to the sleigh runner 10 illustrated in Figs. 1 to 3 inclusive, the same is channel shaped in cross-section throughout its entire length and its ends 11 are bent on a curve having substantially the same radius as the peripheries of the wheels 9 and it is important to note that said curved ends are of such length as to extend above the axes of the wheels 9. The sleigh runners may be appplied to the front and rear wheels 9 by first loosening the means for holding said wheels in operative positions, moving said wheels toward each other, as indicated by broken lines in Fig. 1, placing said runners under the wheels 9 and then moving the wheels 9 into operative positions to cause said wheels to enter the channel shaped runner 10 and their ends 11, as indicated by full lines in Fig. 1. Said wheels are then locked in operative position. Obviously, the channel shaped formation of the runners 10 and their curved ends 11 securely hold the runners in position on the wheels 9 against lateral displacement and as said ends 11 extend above the axes of the wheels 9, said wheels cannot lift out of the same. In applying the improved runners to baby carriages not having folding wheels, said runners may be applied thereto, by springing the same into interlocking engagement with the wheels thereof.

Referring to the invention as illustrated in Figs. 4 and 5, yoke-like spring clips 12 are secured to and within the curved ends 11 of the runners 10 for yielding interlocking engagement with the wheels 9 to detachably secure said runners thereto. With the use of these clips 12, it is not necessary to have the curved runner ends 11 extend above the axis of the wheels to which they are applied, as said clips will prevent the wheels from lifting out of the runner.

The above described invention while extremely simple and of small cost to manufacture, can be very quickly applied to the wheels of a baby carriage to convert the same into a sleigh, or removed therefrom.

What I claim is:—

The combination with front and rear wheels of a vehicle pivoted to swing longitudinally thereof, and means for locking the wheels in extended positions, of a detachable non-resilient sleigh runner applicable to said wheels and formed from a single bar, the ends of the runner being curved upwardly on substantially the same radii as the wheels to which they are applied, said ends being alike and channel shape in cross section and of such length as to extend above the axes of said wheels to hold the same interlocked therewith. said runner being adapted to be applied to said wheels by a movement of the wheels away from each other to cause the same to enter the channels in the ends of the runner and thereby secure the runner to the wheels.

In testimony whereof I affix my signature.

JULIUS A. MAHR.